United States Patent [19]

Hoo

[11] Patent Number: 5,794,149
[45] Date of Patent: Aug. 11, 1998

[54] BASE STATION CONTROLLED HANDOFF METHOD AND APPARATUS

[75] Inventor: John Hoo, La Grange, Ill.

[73] Assignee: Lucent Technologies Inc., Murray Hill, N.J.

[21] Appl. No.: 580,681

[22] Filed: Dec. 29, 1995

[51] Int. Cl.$^6$ ........................................ H04Q 7/22
[52] U.S. Cl. ...................... 455/438; 455/433; 455/436; 455/437
[58] Field of Search ........................... 455/438, 436, 455/437, 411; 370/331

[56] References Cited

U.S. PATENT DOCUMENTS

| | | | |
|---|---|---|---|
| 4,704,734 | 11/1987 | Menich et al. | 455/436 |
| 4,866,710 | 9/1989 | Schaeffer | 370/331 |
| 5,101,501 | 3/1992 | Gilhousen et al. | 455/33 |
| 5,267,261 | 11/1993 | Blakeney, II et al. | 375/1 |
| 5,305,308 | 4/1994 | English et al. | 370/32.1 |
| 5,327,575 | 7/1994 | Menich | 455/437 |
| 5,329,635 | 7/1994 | Wadin | 455/438 |
| 5,345,467 | 9/1994 | Lomp et al. | 375/1 |
| 5,367,558 | 11/1994 | Gillig et al. | 379/59 |
| 5,371,738 | 12/1994 | Moelard et al. | 370/85.1 |
| 5,390,339 | 2/1995 | Bruckert et al. | 455/33.2 |
| 5,396,541 | 3/1995 | Farwell et al. | 455/436 |
| 5,432,843 | 7/1995 | Bonta | 455/438 |
| 5,438,608 | 8/1995 | Kojima | 455/411 |
| 5,586,338 | 12/1996 | Lynch et al. | 455/433 |
| 5,722,074 | 9/1993 | Muszynski | 455/438 |

OTHER PUBLICATIONS

Frame Relay Based A–Interface (BS–MSC) Version 1.0.0 Apr. 6, 1995 AT&T, pp. xii, 1, 56–59, 115–126, 203, 267, 357–358.

*Primary Examiner*—Dwayne D. Bost
*Assistant Examiner*—Jean A. Gelin

[57] ABSTRACT

A handoff method and apparatus are disclosed for use in a wireless communication network in which a base station servicing a call selects a handoff candidate base station based in part on subscriber-specific information. For example, in some wireless networks, certain subscribers can only access a limited number of base stations and the subscriber-specific information identifies such access limitations. A central control processor provides the subscriber-specific information to the base station servicing the call during the course of the call. The base station is then operable to select a handoff candidate from the one or more neighbor base stations based on one or more neighbor base station signal quality measurements and subscriber-specific information.

30 Claims, 10 Drawing Sheets

CANDIDATE BASE STATION

BASE STATION CONTROLLED HANDOFF METHOD AND APPARATUS

FIELD OF THE INVENTION

This invention relates to the field of wireless communications, and, in particular, to base station handoff methods utilized in wireless communication networks.

BACKGROUND OF THE INVENTION

Wireless communication networks are currently experiencing wide popularity in the form of cellular communication systems. Wireless communication networks typically comprise a plurality of base stations that connect wireless subscribers to other communication system users. A base station services a wireless subscriber by providing a communication link over a radio channel for a call, such as, for example, a telephone call. The base station then communicates information and/or voice signals associated with the call, or call signals, to further networks, which may include the public switched telephone network (PSTN). In general, such systems include a central control processor ("CCP") that is connected to and coordinates the operations of the plurality of base stations. In cellular systems, the CCP is sometimes referred to as the executive cellular processor.

Ordinarily, a particular base station can only service a wireless subscriber who is located in close enough proximity to have sufficient radio signal strength to sustain the call. Accordingly, wireless networks employ several base stations which are situated in different geographical areas such that a user is typically within close enough proximity to at least one of the base stations. Cellular systems, for example, operate in this manner.

One of the primary features of a cellular system is the ability to provide uninterrupted service to a call while the subscriber is actively moving in and out of the vicinity of several base stations. In such systems, when the subscriber moves to a location in which the radio signal strength weakens or otherwise deteriorates, the system causes another more suitably located base station to service the call. The system effects the base station change using a procedure referred to as a handoff procedure.

Because wireless communication systems are currently experiencing substantial popularity, the number of users is increasing. The growing user population can create congestion of the frequency spectrum presently allocated for wireless communications. As a result there has been a need to utilize the available frequency spectrum in a more efficient manner. There are several methods by which wireless systems exploit the limited available frequency spectrum in order to maximize the call traffic capacity. These methods feature call signal modulation techniques, including time division multiple access (TDMA) and code division multiple access (CDMA) modulation techniques. Of these, the use of CDMA provides several advantages over the other techniques because it allows the frequency bands within the spectrum to be reused by several subscribers simultaneously. This frequency reuse further increases system capacity.

Another advantage of the frequency reuse capabilities of CDMA wireless systems is that it enables the use of a soft handoff procedure. A soft handoff is a procedure in which a second base station is added to service a call while the original base station continues to service the call. In such cases, both base stations communicate concurrently with the subscriber. Upstream network connections may then utilize signals from the base station having the better connection to the subscriber. For example, consider a call that is serviced by a first base station. Ordinarily, the first base station communicates with the subscriber and forwards the subscriber's call signals to and from an upstream telephone network. If a soft handoff is executed and a second base station is added to service the call, then both the first and second base stations would then communicate with the subscriber. Furthermore, the upstream network connection would then select signals from either the first or second base station to forward to the upstream network. Typically, the better of the two signals is forwarded.

Soft handoffs serve to increase call signal transmission quality because of the ability to choose between two signals. While the use of soft handoffs in frequency division multiple access and TDMA systems is also conceivable, the limitations on current subscriber wireless equipment and the reduced frequency reuse capacity of such systems render their use of soft handoffs impractical.

Handoff procedures, whether soft or otherwise, are controlled or supervised in two different manners. In one group of systems, the CCP controls the handoff process. In another group of systems, the individual base stations control the handoff process. CCP controlled handoffs have been widely used but are disadvantageous because they can lead to processing delays when the CCP is responsible for the operations of a large number of base stations.

In systems using base station controlled handoffs, a base station servicing the call, often called the primary base station, is responsible for making handoff decisions. Base station controlled handoffs not only reduce the computational load on the system's CCP, but also reduce delay in the handoff procedure by reducing communications between the base station and the CCP. Such systems have been described in, for example, M. J. English, et al. U.S. Pat. No. 5,305,308 that issued Apr. 19, 1994, at column 36, line 1 to column 37, line 6, which patent is incorporated by reference herein, and is assigned to the assignee of the present invention.

A difficulty encountered with base station controlled soft handoffs arises from the advent of subscriber-specific levels of service. As wireless communications systems have evolved, it has been increasingly desirable to offer various features and flexible cost structures to individual subscribers. Some subscriber-specific features involve the availability of access to certain base stations. For example, subscribers of lower grades of service may have access to fewer base stations than subscribers of higher grades of service. The grades of service are determined by particular features that subscribers may select at an added cost. In addition to grades of service, access to base stations may be limited by application-oriented restrictions. For example, a shopping center may provide cellular service to security employees that extends throughout the shopping center and the parking lot. Subscribers to this service would only have access to a single base station that is located in close proximity to the shopping center. Because of the existence of such features, some procedure is necessary to prevent handoffs to certain base stations during the course of a call depending upon subscriber-specific information.

In systems using CCP-controlled handoffs, subscriber-specific parameters that identify the number and type of features purchased by each subscriber is ordinarily accessible or available to the CCP. Accordingly, the CCP considers such subscriber-specific parameters, among other things, in determining whether a particular handoff may be performed. In systems using base station controlled handoffs, however, the individual base stations do not ordinarily have access to any such subscriber-specific information. As a result, a base station controlled handoff must be executed regardless of whether the subscriber's grade of service or selected features would permit the handoff. Consequently, there exists a need for a method of determining whether a handoff candidate is allowed in a base station controlled handoff.

SUMMARY OF THE INVENTION

The present invention fulfills this need by providing subscriber-specific information from a central control processor to a primary base station during a call. With the subscriber-specific information, the primary base station can determine an appropriate handoff candidate based on both signal quality strength and the subscriber's grade of service.

One embodiment of the present invention includes a base station for use in a wireless communication network. The wireless communication network further includes a switching center and one or more neighbor base stations. The base station according to this embodiment includes a radio for communicating with a wireless terminal using radio frequency signals, a circuit connected to the radio for converting radio frequency signals to digital signals, and a base station controller. The base station controller is operable to select a handoff candidate from the one or more neighbor base stations based on one or more neighbor base station signal quality measurements and subscriber-specific information. The base station controller is further operable to transmit a request signal to the handoff candidate to initiate the handoff.

In another embodiment, the invention includes a switching center for use in a wireless communication network. The switching center includes a digital control switch for receiving call signals from one or more base stations and a central control processor. The central control processor, upon notification of a base station status change, is operable to generate a first list of neighbor base stations associated with one or more base stations servicing the call, generate from the first list a second list of subscriber ineligible neighbors based on subscriber-specific information, and provide an update signal containing data representative of the second list to a primary base station.

These as well as other features and advantages of the present invention will become readily apparent to those of ordinary skill in the art by reference to the following detailed description and accompanying drawings.

DETAILED DESCRIPTION

Figure 1:
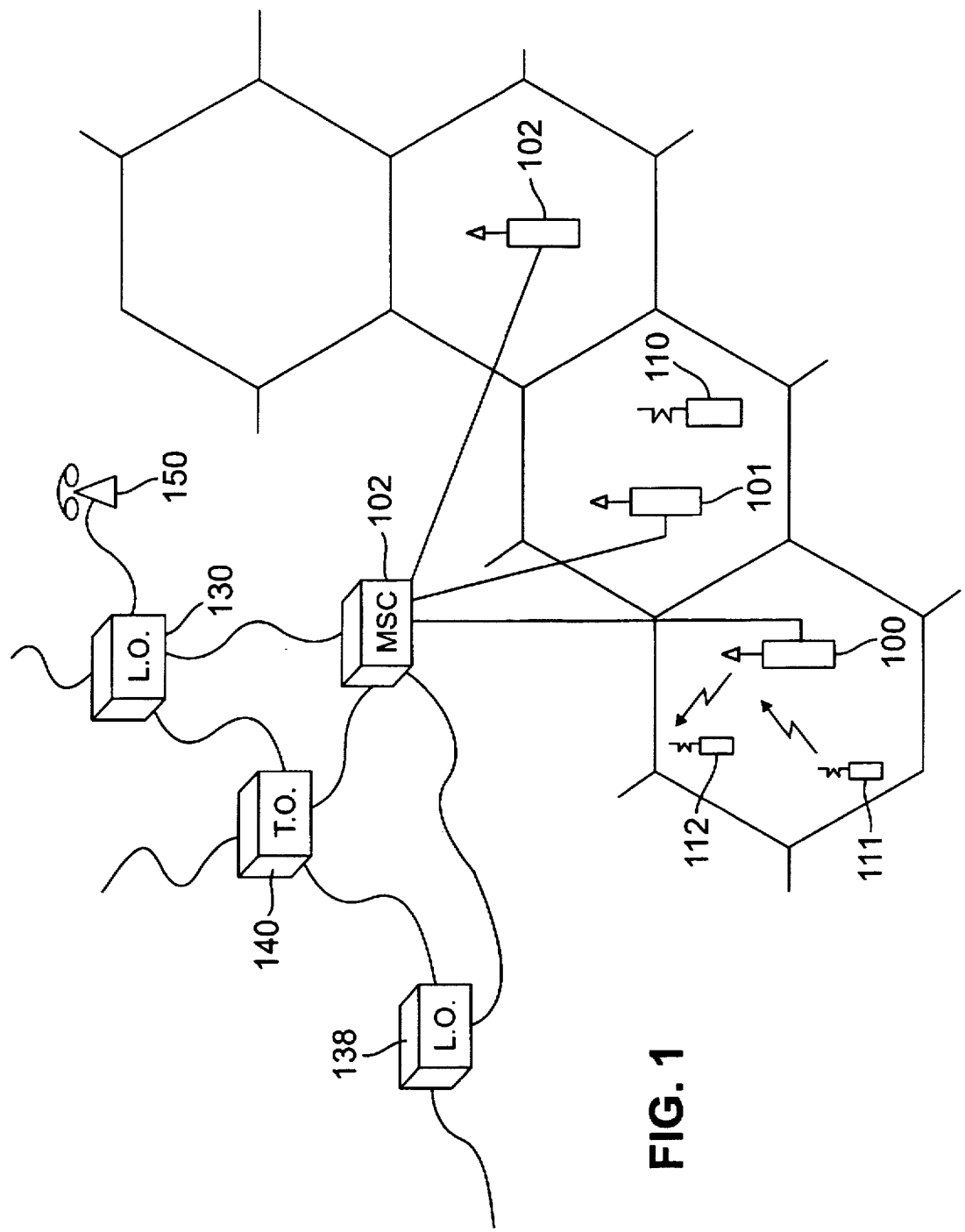
FIG. 1 illustrates an exemplary embodiment of a wireless communications system according to the present invention operating in conjunction with an external communication network.

FIG. 1 illustrates an exemplary wireless communications system according to the present invention operating in conjunction with an external communications system. The example in FIG. 1, in particular, illustrates the interconnection between portions of a wireless or cellular system and a publicly-switched telephone network (PSTN), including local and long-distance telephone networks. The wireless communications system includes a plurality of geographically-dispersed base stations 100, 101 and 102 which provide radio communication services to wireless subscriber terminals, including first and second wireless terminals 111 and 112. The base stations 100, 101 and 102 are each operably connected to a wireless switching center 120. The wireless switching center 120 is operably connected to the land-based telecommunications network through first and second local offices 130 and 138, respectively, and a toll office 140. The local offices 130 and 138 are known subsystems operable to provide switching and call processing functions in a local telephone network. The toll office 140, among other things, provides an operable connection to a long distance network, not shown.

For purposes of illustration, consider a call, or call, that includes the provision of a communication link between a first subscriber using the first wireless terminal 111, such as a cellular telephone, and a second subscriber using a telephone 150. Although the example given herein discusses a telephone call, the present invention may suitably be used in conjunction with a call involving a wireless communication system to accomplish the electronic communication of information in any form, including but not limited to analog oral communications, digital ASCII data, and analog and digital video and/or audio data in any suitable format.

During the call between the first subscriber and second subscriber, the first wireless terminal 111 and the base station 100 communicate over a radio channel, said radio channel defined in part by one of a plurality of available radio frequency pairs. To this end, the first wireless terminal 111 and the base station 100 each include radios operable to communicate over the radio channel. The base station 100 in turn converts the radio communication signals to digital communication signals, which are communicated to the switching center 120. The switching center 120 then communicates the digital communication signals in modified format to the appropriate local office, which may suitably be the local office 130. The local office 130, under the control of the PSTN network, or a portion thereof, translates the signals into suitable form for transmission to the telephone 150.

If the first subscriber (and the first wireless terminal 111) significantly changes position with respect to the base stations 100 and 101, the base station 100 may determine that it is necessary to execute a soft handoff whereby the base station 101 begins servicing the call. If so, then the base station controls execution of the handoff taking into account subscriber-specific information according to the present invention.

To execute a handoff according to the present invention, the base station selects a handoff candidate base station, or simply handoff candidate, from its neighbor base stations based in part on subscriber-specific information or restrictions. Neighbor base stations are typically defined as base stations having geographical coverage areas that border or overlap the referenced base station. For example, base stations 100 and 102 are neighbor base stations with respect to base station 101. Other suitable definitions of neighbor base stations exist, although such definitions generally imply relative proximity between the referenced base station and the neighbor base station. In this exemplary operation, the base station 101 is a neighbor base station with respect to the base station 100 and is selected as the handoff candidate.

After completion of the handoff procedure, both the base station 100 and the base station 101 service the call contemporaneously. As a result the switching center 120 receives call signals associated with the call from each of the base stations 100 and 101. The switching center 120 then selects the call signals from the base station having the better quality signal and communicates those signals to the local office 130. It is apparent from such operation that while several base stations may at some point in time service the call and thus provide a portion of the communications link between the first subscriber and the second subscriber, the land-based telecommunications network receives only one signal and thus is not aware of how many base stations are providing service.

Figure 2A:
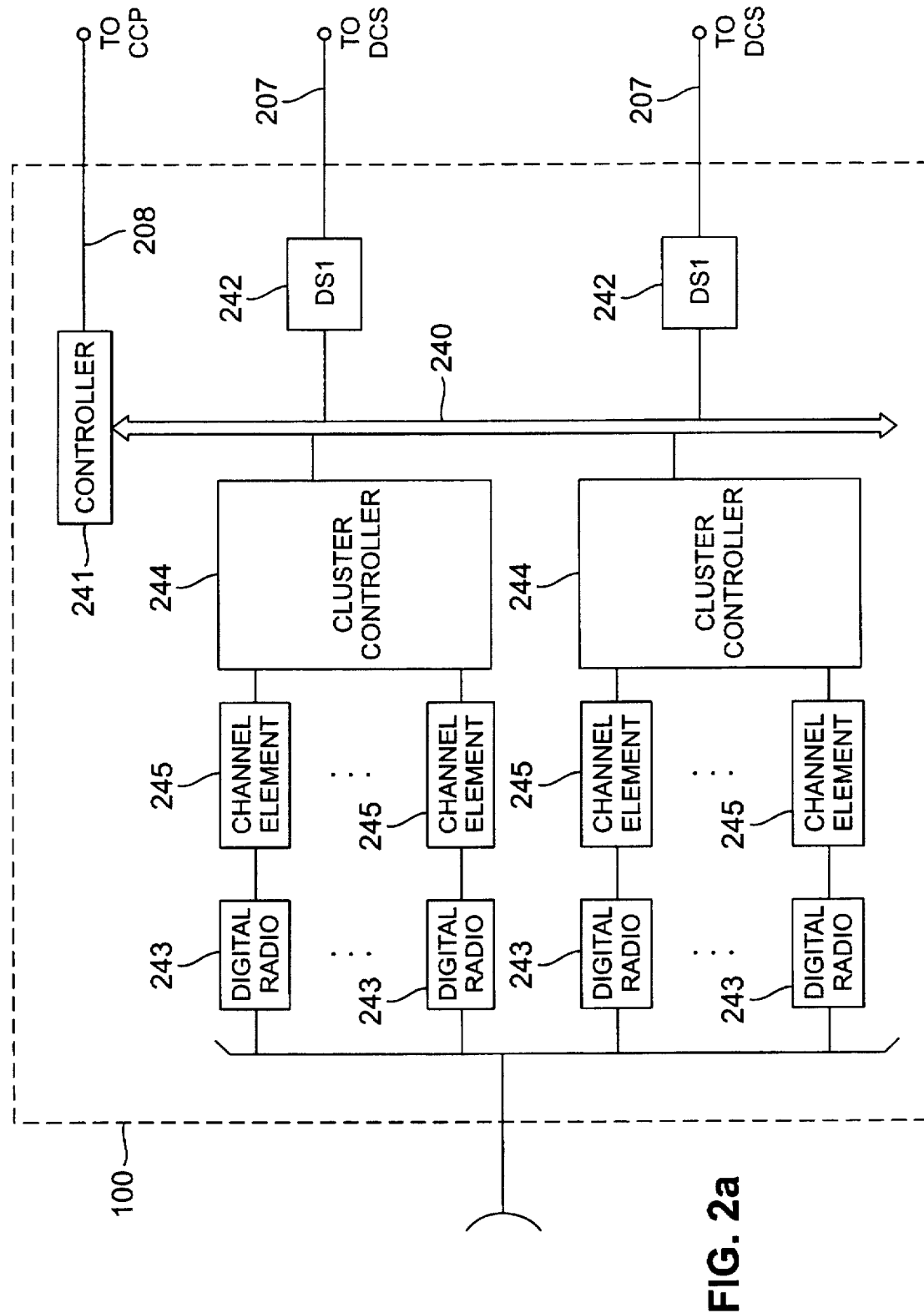
FIG. 2a illustrates an exemplary embodiment of a base station according to the present invention.

FIG. 2a illustrates in further detail an exemplary embodiment of a base station according to the present invention, and more particularly, the base station 100 of FIG. 1. Although only the first base station 100 is shown in detail, the second base station 101 of FIG. 1 may suitably have a similar structure. Referring to FIG. 2a, the base station 100 includes a plurality of digital radios 243, a base station controller 241, a plurality of channel elements 245, a plurality of cluster controllers 244, a TDM bus 240, and a plurality of DS1 interfaces 242. It is to be noted that the base station 100 is given by way of example, and base stations having other structures may suitably be used to the extent that they have at least one base station controller, at least one radio, and a circuit for converting radio signal signals to digital communication signals. Accordingly, while the embodiment discussed generally below comprises an asynchronous transfer mode ("ATM") capable base station, a non-ATM capable base station may readily be used.

The digital radios 243 in the present embodiment are operable to communicate radio frequency signals over a code division multiple access ("CDMA") channel that employs a CDMA protocol. A CDMA channel is defined or specified by a combination of a frequency band, a CDMA code, and a frame offset. Accordingly, several CDMA channels may utilize the same frequency band by using different codes and/or frame offsets. In any event, each of the digital radios 243 is connected to one or more corresponding channel elements 245. The channel elements 245 are further individually connected to one of the cluster controllers 244. The cluster controllers 244 are each further connected to the TDM bus 240. The TDM bus 240 operates to provide a bus interconnection between the cluster controllers 244, the base station controller 241, and the DS1 interfaces 242. Suitable radios, channel elements and cluster controllers are shown, for example, in U.S. Pat. No. 5,305,308, col. 11, line 39 through col. 12, line 22. The base station controller 241, which may suitably be an AT&T Autoplex Series II cell site control complex, controls the operation of the various components of the base station 100.

In general, the base station operates to provide service to a call, and more specifically, to provide communication of call signals between one or more wireless terminals, not shown, and a switching center, not shown. Call signals comprise voice and/or other data that the subscriber generates or receives from another party, as discussed above in connection with FIG. 1. In addition to call signals, however, the base station 100 also transmits and receives control signals to and from, respectively, the wireless terminals and the switching center. Control signals include the various supervisory and maintenance signals, including those discussed below in connection with FIGS. 3, 4a, 4b, 5a, 5b, 6 and 7.

The call signal processing operation of the base station is generally known and briefly described below. Call signals from a wireless terminal are typically in the form of a CDMA spread-spectrum signal. The wireless terminal transmits the signals on an assigned CDMA channel to a select one of the digital radios 243. The select digital radio 243 and an associated channel element 245 demodulate and otherwise process the transmitted signal to produce a digital data packet signal.

The channel element 245 then provides the digital data packet signal to the cluster controller 244. The cluster controller 244, among other things, coordinates the movement of the digital data packet signal with like signals of other calls between the channel elements 245 and the TDM bus 240. The operations of the cluster controller 244, digital radios 243, and channel elements 245 are described in further detail in U.S. Pat. No. 5,305,308 at col. 11 line 39 to col. 13, line 33.

Figure 2B:
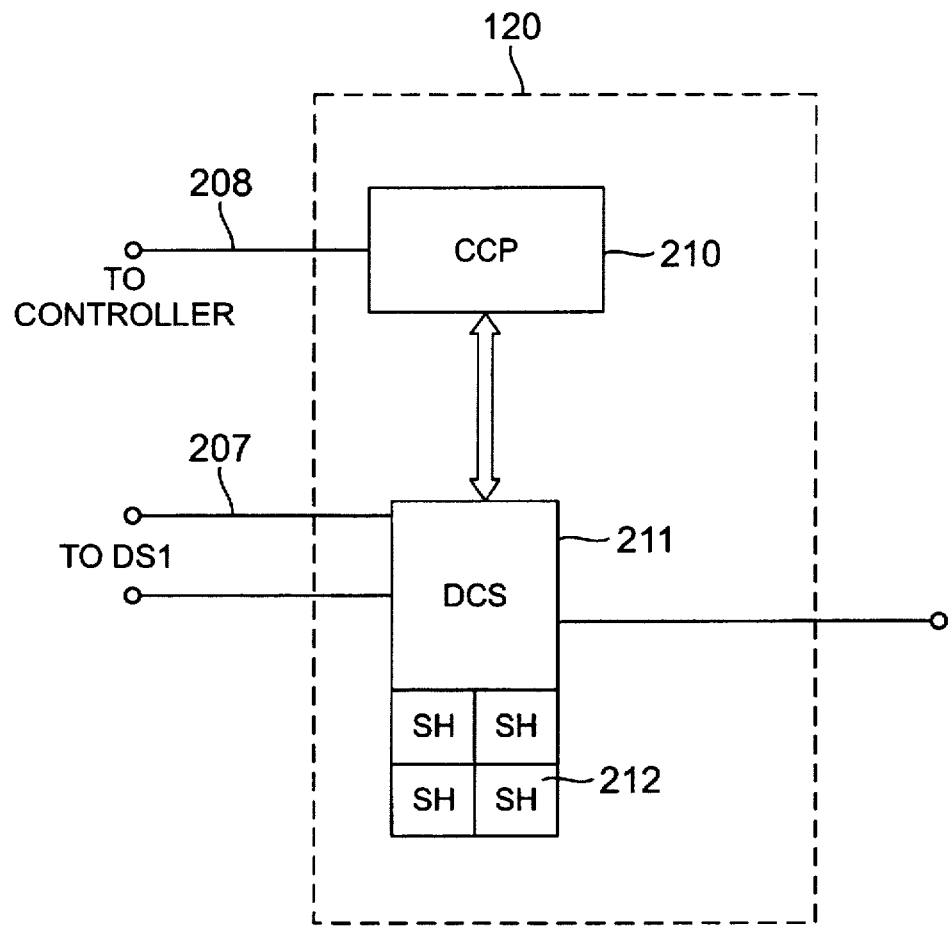
FIG. 2b illustrates an exemplary embodiment of a switching center according to the present invention.

The TDM bus 240 then routes the digital data packet signal from the cluster controller 244 to one of the DS1 interfaces 242, which transmits the signal in a select virtual circuit connection over one of the voice/data trunks 207, also referred to as packet pipes, to the switching center 120, illustrated in FIG. 2b. To this end, the DS1 interface 241 is operable to perform further protocol formatting in order to facilitate transmission over the voice/data trunks 207. Suitable DS1 interfaces and packet pipes are well known to those of ordinary skill in the art. Examples of such devices are described in U.S. Pat. No. 5,305,308 at col. 14, lines 33 through 60.

The base station 100 furthermore transmits (and receives) control signals to (and from) wireless terminals in a similar manner as that described above in connection with the call signals, in other words, over a radio channel. Within the base station 100, however, the control signals are routed to and from the base station controller 241, instead of the DS1 interface 242 as was the case with call signals. Additionally, the base station controller 241 communicates control signals to the switching center using the control signal line 208. The controller 241 in the present embodiment is operable to perform the operations described below in connection with FIGS. 4a, 4b, 5a, 5b and 6 to effectuate handoffs in accordance with the present invention.

FIG. 2b illustrates in further detail an exemplary embodiment of a switching center according to the present invention, and more particularly, the switching center 120 of FIG. 1. The switching center 120 includes a central control processor ("CCP") 210 operably connected to a digital control switch ("DCS") 211. The CCP is further connected to the control line 208 and the DCS 211 is further connected to the voice/data trunks 207. The CCP 210, which in a cellular system is sometimes referred to as an executive cellular processor, is operable to oversee control of the operations of several base stations in a wireless network. The CCP has access to subscriber-specific parameters as is known in the art. The CCP 210 is further operable to communicate control signals to the DCS 211. The DCS 211 includes at least one speech handler 212, and typically several other similar speech handlers. The speech handler 212 comprises circuitry operable to receive signals from one or more base stations and convert the signals into a format compatible with an external network, such as a PSTN. The DCS 211 may suitably comprise a commercially available telecommunications digital cellular switching system such as the AT&T 5ESS® Switch DCS or the like.

The DCS 211, in turn, provides the digital data packet signals for each call to a distinct speech handler 212 assigned to the call transaction. The speech handler 212 then forwards the digital data packets signals to the PSTN network. In some cases, the digital data packet signals may be forwarded back through the wireless communications network to another wireless subscriber.

If, during the course of the call, a soft handoff is executed, then a second base station will also provide call signals over a voice/data trunk 207 using methods that are analogous to those described above in connection with FIG. 2a. In such a case, the DCS 211 would then receive signals for the call from both base stations. In particular, the speech handler 212 would receive digital data packet signals from both the first base station 100 and the second base station 101. The speech handler 212 would then develop a signal that represents the best quality voice signal therefrom and provide the signal to the upstream PSTN (or wireless) subsystems handling the call.

Figure 3:
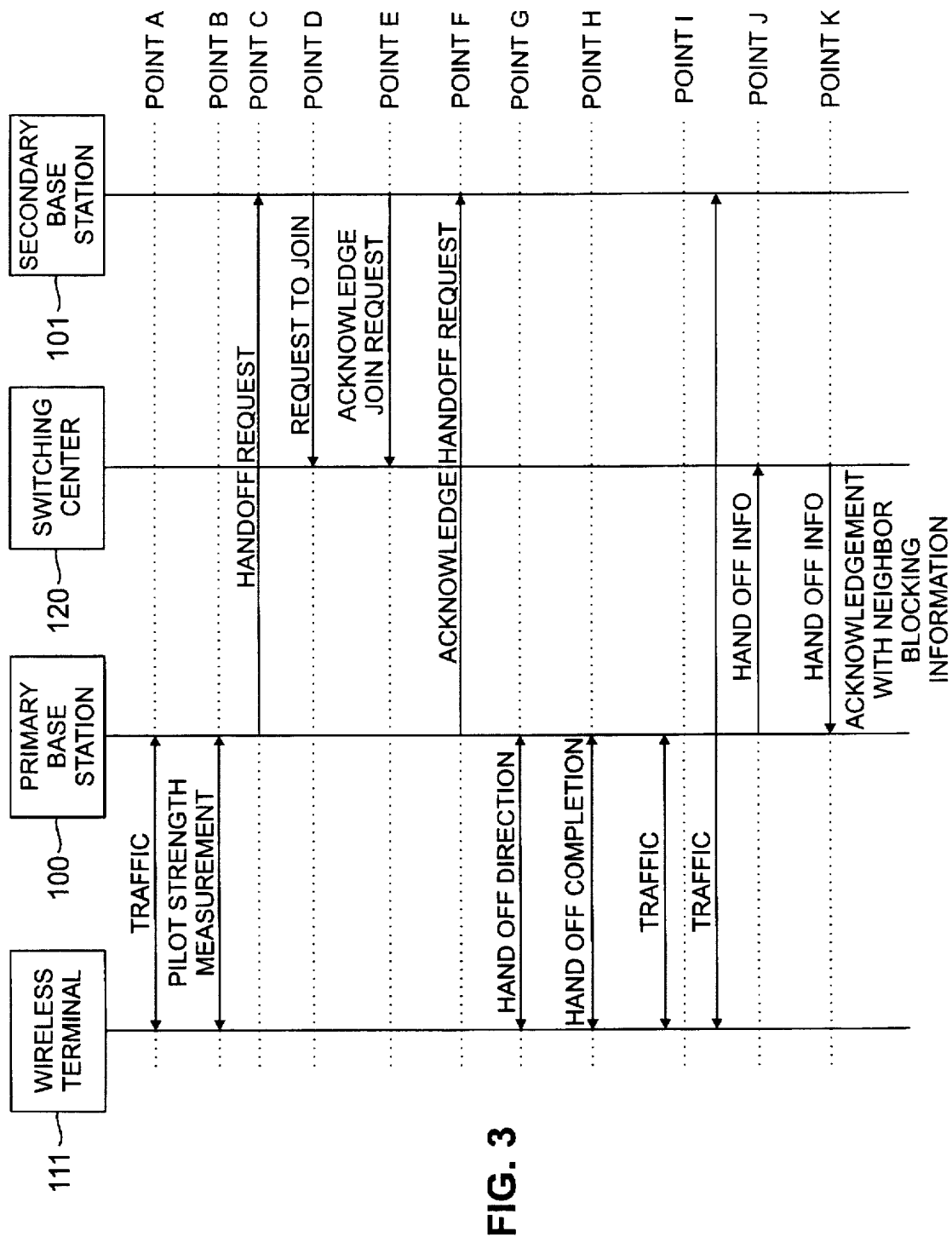
FIG. 3 illustrates a signal flow diagram of the control signals transmitted between the various components of the exemplary wireless communication network of FIG. 1 during the performance of an exemplary handoff procedure.

FIG. 3 illustrates a signal flow diagram of the control signals transmitted among the various components of the wireless network illustrated in FIGS. 1, 2a and 2b, including the control signals transmitted in the course of a soft handoff procedure according to the present invention. The exemplary soft handoff procedure described in connection with the timing diagram of FIG. 3 involves the base station 100 (referred to as the primary base station), the base station 101 (referred to as the secondary base station), the wireless terminal 111, and the switching center 120, all from FIGS. 1 and 2. In general, the soft handoff procedure starts in a state in which the primary base station 100 is servicing a call, and then changes to a state in which both the primary base station 100 and the secondary base station 101 service the call.

At point A, the primary base station 100 is actively servicing a call involving the wireless terminal 111. It is to be noted that point A does not indicate the transmission of a control signal but rather indicates an ongoing state. At point B, the wireless terminal 111 transmits a signal reporting the signal quality measurements of the neighboring base stations to the primary base station 100. To this end, the wireless terminal 111 from time to time during the call measures the strengths of beacon signals, known as pilot channels, of the neighboring base stations. The pilot channel strengths are then transmitted to the primary base station 100.

Between points B and C, the primary base station may select a handoff candidate if it appears that a handoff would be advantageous. If circumstances warrant a handoff, then the primary base station 100 selects an appropriate handoff candidate using, among other things, the signal quality measurements, while also taking into account subscriber-specific information. In a present embodiment of the present invention, the subscriber-specific information comprises a neighbor blocking list. The neighbor blocking list contains a list of all neighboring base stations for which a handoff is prohibited for the subscriber involved in the call. The primary base station 100 thus selects the neighboring base station with the best signal quality measurement that is not on the neighbor blocking list. In the exemplary procedure illustrated in FIG. 3, it is assumed that the primary base station 100 selects the secondary base station 101 as the most appropriate handoff candidate using this criteria.

As a result, at point C, the primary base station 100 sends a request signal requesting a handoff to the secondary base station 101. The secondary base station 101 then, at point D, sends a signal to the switching center 120 requesting to "join", or in other words, to begin servicing the call. At point E, the switching center 120 sends a message acknowledging and approving the join request to the secondary base station 101. Typically, the switching center 120 will approve join requests if the speech handler associated with the call is able to communicate with the requesting base station.

The secondary base station 101 then, at point F, sends a soft handoff acknowledgement signal to the primary base station 100 acknowledging the handoff request. Thereafter, at point G, the primary base station 100 sends a soft handoff signal directing the wireless terminal 111 to begin communicating with the secondary base station 101. Once the wireless terminal 111 and the secondary base station begin communicating at point H, the wireless terminal 111 sends a message to the primary base station 100 advising that the handoff has been completed. At point I, communication traffic flows between the wireless terminal 111 and both the primary base station 100 and the secondary base station 101, or in other words, both base stations are servicing the call.

Then, at point J, the primary base station 100 provides a handoff information signal to the switching center 120, which includes information identifying the secondary base station 101 as being involved in the handoff. The switching center 120, as is known in the art, includes or has access to subscriber-specific parameters, such as service limitations for each subscriber. The switching center 120, among other things, uses the handoff information signal and the subscriber-specific parameters to determine a new neighbor blocking list based on the addition of the secondary base station 101. Thereafter, at point K, the switching center 120 sends an update signal, which may be part of a handoff information acknowledgement signal, to the primary base station 100. The update signal includes the new neighbor blocking list. The primary base station 100 may thereafter refer to the new neighbor blocking list in determining subsequent handoff candidates.

One advantageous aspect of the present invention is that a primary base station is operable to determine from a group of neighboring base stations a handoff candidate based, in part, on subscriber-specific information, which in this case is the neighbor blocking list. The subscriber-specific information based handoff determination is necessary if differing levels of service and/or different features are to be made available to subscribers and subsequently enforced.

FIGS. 4a, 4b, 5a, 5b, 6, and 7 describe exemplary operations of various elements of a wireless communication system according to the present invention, including but not limited to the operations involved in the soft handoff procedure described above in connection with FIG. 3. As a result, when appropriate, the points A through K of FIG. 3 are cross-referenced in the following discussion. In addition to the soft handoff procedure, however, the operations described below also include those operations necessary to perform another type of handoff procedure, referred to as a semisoft handoff. In any event, the operations described in FIGS. 4a, 4b, 5a, 5b, 6, and 7 are performed in the context of a wireless communication system that includes a switching center, a plurality of base stations, and a wireless terminal, such as is described above in connection with FIGS. 1 and 2.

Figure 4A:
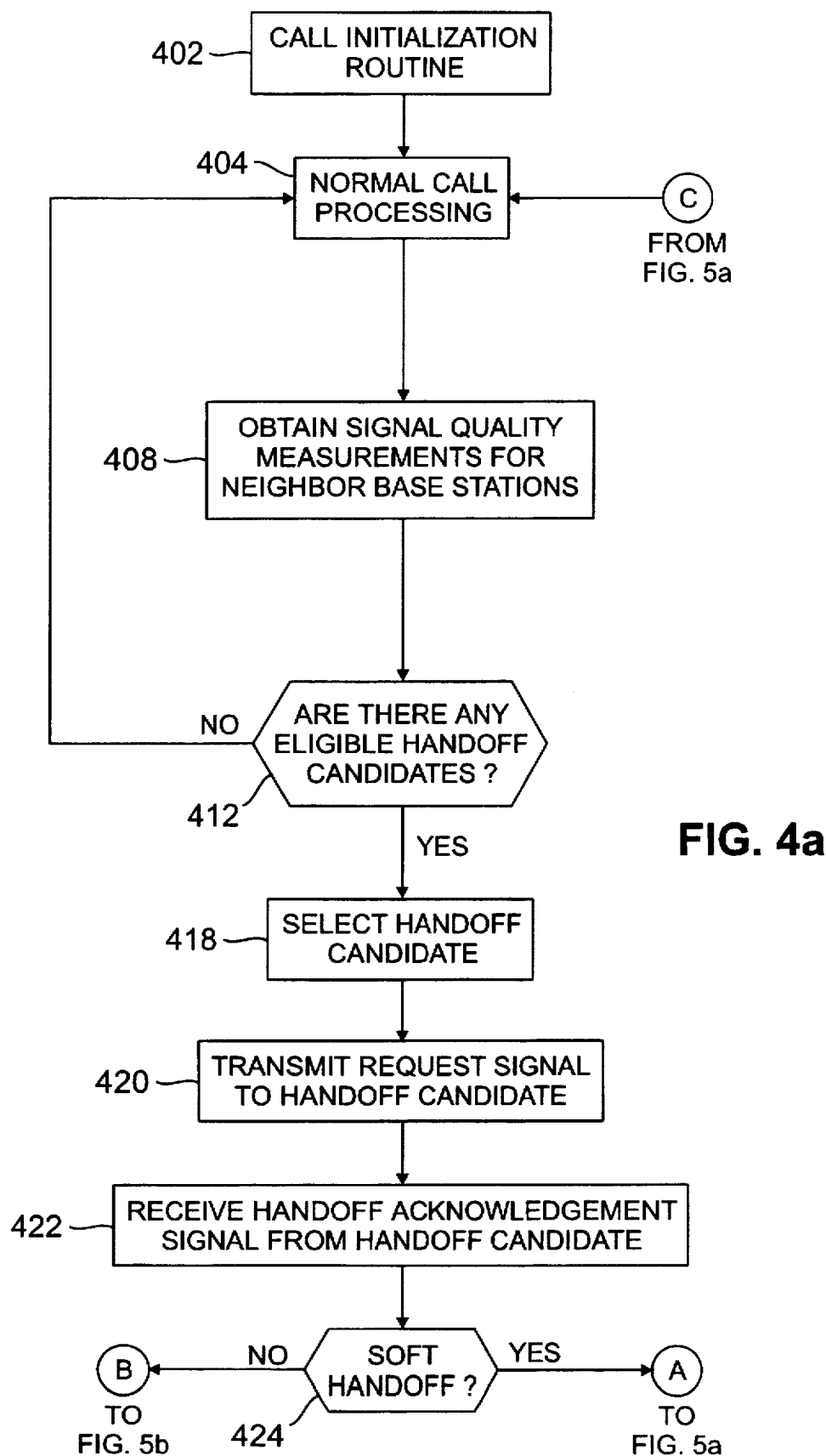
FIGS. 4a and 4b illustrate an exemplary set of operations executed by a base station controller of a base station in accordance with the present invention.

FIG. 4a illustrates in further detail of an exemplary set of operations executed by a base station controller, such as the controller 241 of FIG. 2, operating in accordance with the present invention. As discussed above, the base station controller supervises the operation of a primary base station servicing a call. The flow diagram of FIG. 4a shows an overview of the supervisory functions of the primary base station controller, or simply primary controller, with respect to the call. It will be noted that an actual primary controller will typically supervise several such calls contemporaneously.

Figure 4B:
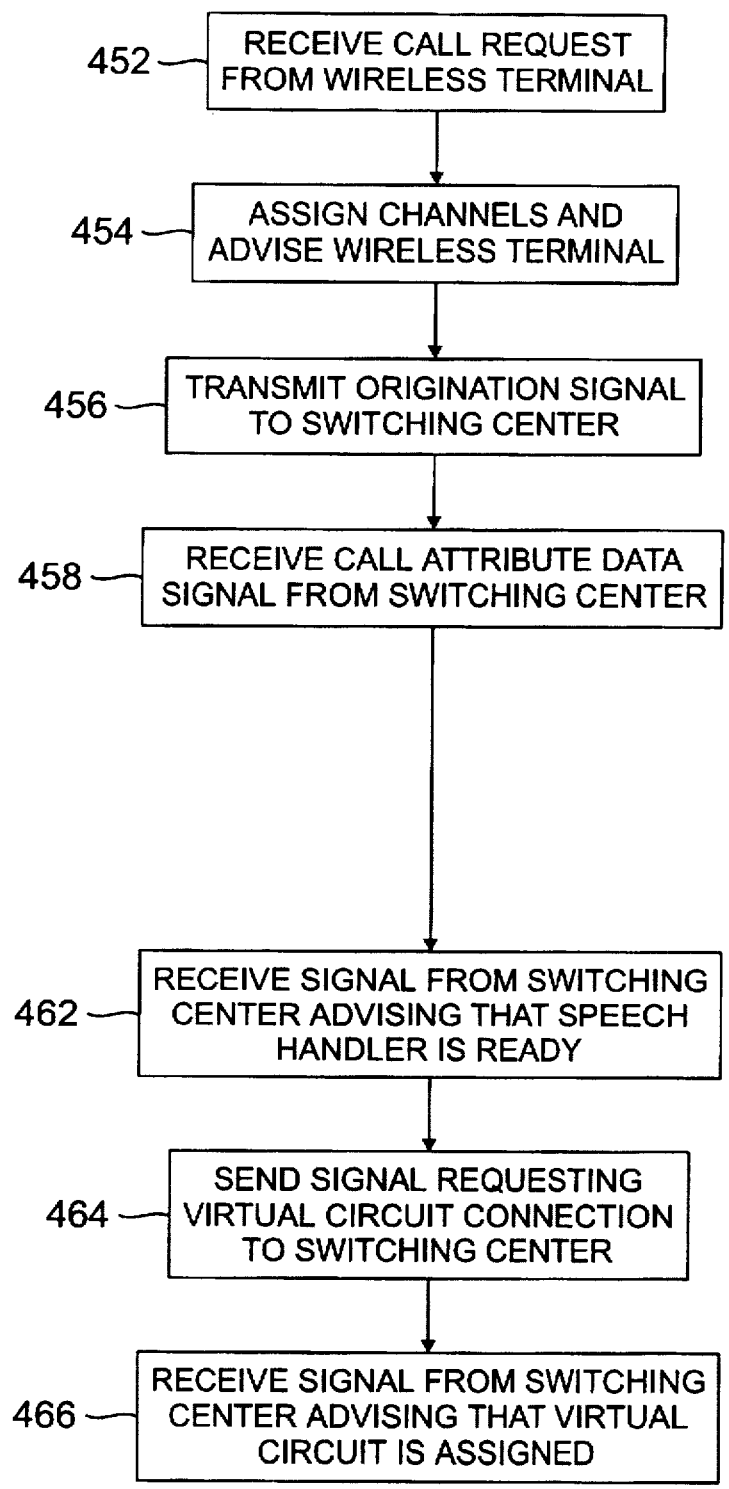

When the subscriber at the wireless terminal either initiates a call transaction or is paged (or called), the primary controller, in step 402, performs a call initialization routine which effectively sets up the communication link between the subscriber and another party. An example of an initialization routine is illustrated in FIG. 4b. FIG. 4b illustrates an exemplary initialization routine for a call originated at the wireless terminal, or in other words, an outgoing call.

Referring to FIG. 4b, in step 452, the primary controller first receives a call request from the wireless terminal. Thereafter, in step 454, the primary controller assigns an available CDMA radio channel to the call and transmits a signal to the wireless terminal identifying the assigned CDMA radio channel. At this point, the primary controller also typically informs the wireless terminal of the identity of the neighboring base stations and their pilot channels. Such information allows the wireless to periodically measure the signal quality from each of the neighboring base stations. The primary controller thereafter proceeds to execute step 456.

In step 456, the primary controller transmits an origination signal to the switching center, and more specifically, a CCP located within the switching center, such as the CCP 210 of FIG. 2. The origination signal advises the switching center that a call is being initiated, and includes subscriber identification information, the dialed digits, and base station traffic information. The origination signal may suitably be a MS_ORIG_PAGERSP_C origination signal for use in a system that employs the A-Interface standard. The A-Interface standard is described in "Frame Relay Based A-Interface (BS-MSC)," Version 1.0.0, AT&T Corporation (Apr. 16, 1995), which is incorporated herein by reference.

Thereafter, in step 458, the primary controller receives from the switching center a call attribute data signal containing call identification information, supervisory information, and a neighbor blocking list. The neighbor blocking list contains a list of all neighboring base stations from which the subscriber is not permitted to receive service, based on a predetermined the level of service or the number and type of features specific to the subscriber. The call attribute data signal may suitably be a RADCH_INIT_C signal for a system that employs the A-Interface standard.

At some point in time after executing step 458, the primary controller in step 462 also receives from the switching center a signal advising that a speech handler, such as the speech handler 212 of FIG. 2, has been allocated to the call. After receiving that signal, in step 464, the primary controller requests virtual circuit allocation on a trunk between the primary base station and the switching center, such as one of voice/data trunks 207 of FIG. 2. Once the primary controller receives a message that a virtual circuit has been assigned in step 466, then the base station may begin servicing the call, or in other words, transmitting call signals between the switching center and the wireless terminal.

It is to be noted that the precise order of the steps in the initialization routine illustrated in FIG. 4b, as well as the information transmitted in each particular signal, will vary from system to system. For the purposes of the present invention, however, it is important that the neighbor blocking list, or other suitable subscriber-specific information, be transmitted to the base station during or after the initialization procedure. In any event, upon completion of the initialization routine, the primary controller returns to step 404 of the flow diagram in FIG. 4a.

In step 404, the primary controller supervises ordinary call processing routines as is known in the art. As a part of the call processing, the primary controller periodically measures the signal quality from the wireless terminal. If signal quality diminishes below a certain point, the call may be terminated or a handoff may be forced, as is known in the art.

In addition, during call processing, the primary controller obtains from the wireless terminal signal quality measurements for many and typically all of the neighboring base stations, as is illustrated in step 408. The wireless terminal typically obtains such signal quality information by measuring the signal strength of the neighbor base station pilot channels. The signal quality of a neighboring base station is approximated or derived from the measured pilot channel strength, using methods which are well-known in the art.

The provision of the neighbor base station signal quality measurements to the primary controller may occur either periodically or upon occurrence of an event. For example, the wireless terminal may provide the current signal quality measurements of the neighboring base stations when one or more pilot channel measurements exceeds or falls below a predetermined threshold. In the alternative, however, the wireless terminal may simply from time to time provide the pilot signal strength measurements to the controller, which in turn temporarily stores the values. In either case, in step 408, the primary controller obtains relatively current neighbor signal quality measurements. The primary controller thereafter proceeds to step 412.

In step 412, the primary controller determines whether there are any eligible handoff candidates. The eligible handoff candidate determination is based on a number of factors which may include the neighbor base station signal quality measurements, the number and signal quality of base stations currently servicing the call, and the neighbor blocking list. Those of ordinary skill in the art may readily determine other methods of identifying eligible handoff candidates. In any such method, however, according to the present invention, an otherwise suitable handoff candidate is not an eligible handoff candidate if it is on the neighbor blocking list. If there are no eligible handoff candidates, then the primary controller continues to service the call and returns to step 404.

If, however, in step 412, it is determined that there is at least one eligible handoff candidate, then the primary controller in step 418 selects a handoff candidate from the eligible handoff candidates, which may suitably be the eligible handoff candidate having the best signal quality measurement. Thereafter, in step 420, which corresponds to point C of FIG. 3, the primary controller transmits a request signal to the handoff candidate base station requesting a handoff. The primary controller typically routes the request signal to the candidate base station through the switching center. The handoff request signal may suitably be an INTERBS_HO_REQ_C signal for a system employing the A-Interface standard.

If the candidate base station acknowledges and approves the handoff, then the controller receives a handoff acknowledgement signal from the handoff candidate in step 422, which includes information identifying the handoff type as either a soft handoff or a semisoft handoff. A detailed explanation of the differences between soft handoffs and semisoft handoffs is provided further below. In general, however, a soft handoff is a handoff in which the handoff candidate is added to service the call and the primary base station also continues to service the call. A semisoft handoff, on the other hand, usually requires that the primary base station discontinue servicing or drop the call upon completion of the handoff. The determination of whether a soft handoff or a semisoft handoff is executed is discussed further below in connection with FIG. 6. In any event, if the handoff type is soft, then in step 424, the primary controller proceeds to step 502 of FIG. 5a to execute the soft handoff. If, however, the handoff type is semisoft, then in step 424 the primary controller proceeds to execute step 552 of FIG. 5b to execute the semisoft handoff.

Figure 5A:
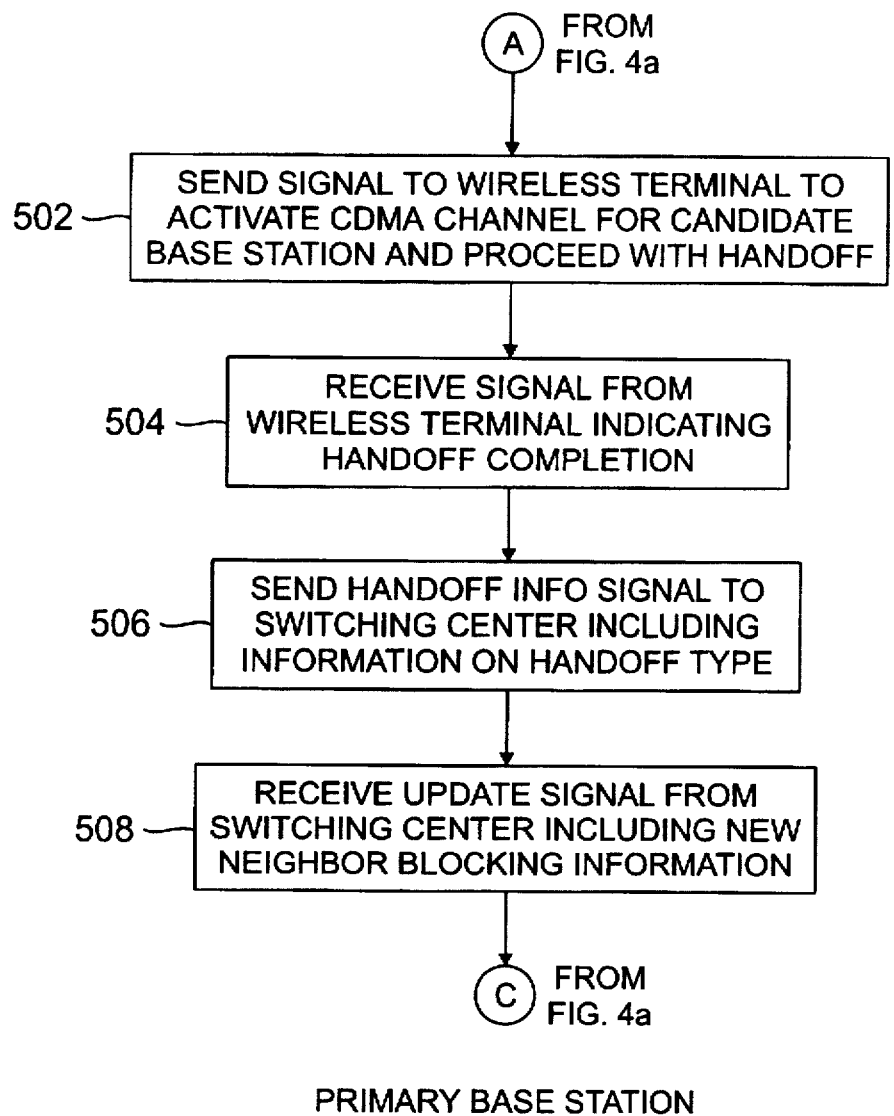
FIG. 5a illustrates an exemplary set of operations executed by a controller of a primary base station during the course of a soft handoff procedure according to the present invention.

FIG. 5a illustrates an exemplary flow diagram of the operations executed by the primary controller after the handoff candidate has acknowledged that a soft handoff may occur in step 422 of FIG. 4a. In step 502, the primary controller transmits a soft handoff signal to the wireless terminal advising the wireless terminal to activate a CDMA radio channel for communicating with the handoff candidate. Once the wireless terminal activates the CDMA radio channel and begins communicating with the handoff candidate, the wireless terminal transmits a signal which is received by the primary controller in step 504 advising that the handoff has been completed. Steps 502 and 504 correspond to points G and H, respectively, of FIG. 3.

Once the soft handoff is completed, the primary controller in step 506 transmits an information signal to the switching center. The information signal identifies the handoff type (soft, semisoft, etc.), the reason for the handoff, and information identifying the newly added handoff candidate, which is thereafter referred to as the secondary base station. The information signal may suitably be included with a HO_INFO or handoff information signal that is ordinarily transmitted to the switching center in accordance with the A-Interface standard for wireless systems.

In step 508, the primary controller receives an update signal from the switching center. This update signal contains a new list of neighbor base stations that takes into account any new neighbors added by the presence of the secondary base station. The list of neighbors is updated because the secondary base station's neighbors now qualify as potential handoff candidates. In addition, the update signal contains an updated neighbor blocking list. The neighbor blocking list must be updated to include any neighbors of the secondary base station for which handoff is prohibited. The update signal may suitably be included within a HO_INFO_ACK or handoff information acknowledgement signal that is ordinarily transmitted by the switching center in accordance with the A-Interface standard for wireless systems. The operations of the switching center performed in conjunction with generating and updating neighbor blocking lists is described further below in connection with FIG. 7.

Once the soft handoff is complete and the updated neighbor blocking list has been provided to the primary controller, the primary controller returns to step 404 and continues call processing.

Figure 5B:
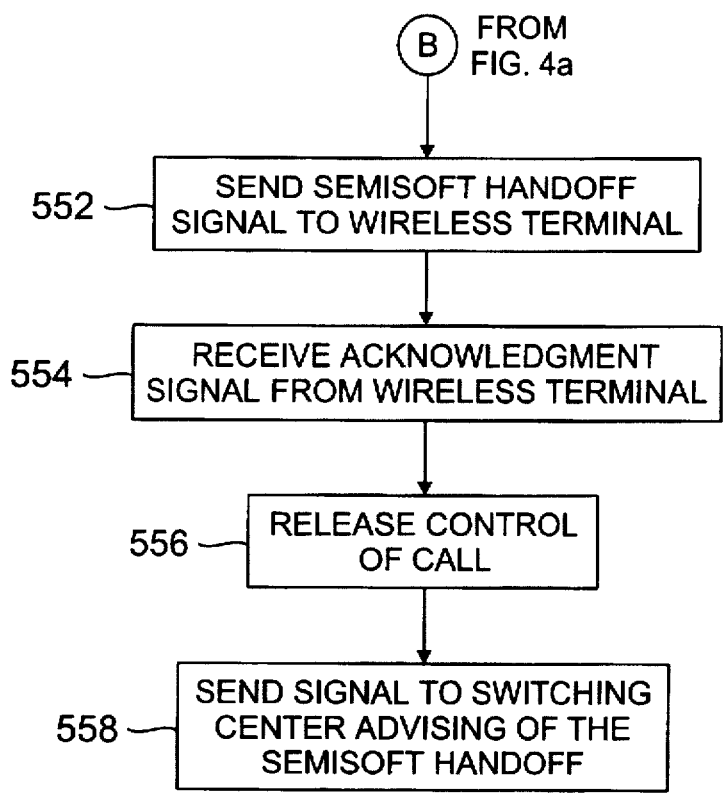
FIG. 5b illustrates an exemplary set of operations executed by a controller of a primary base station during the course of a semisoft handoff procedure according to the present invention.

FIG. 5b illustrates an exemplary set of operations executed by the primary controller to effectuate a semisoft handoff between the primary base station and the handoff candidate. A semisoft handoff is employed when resources are not available to execute a soft handoff. In particular, a semisoft handoff must be used when the handoff candidate base station does not have a CDMA channel available that uses the same frequency band as the CDMA channel employed by the first base station. In such a case, the handoff may proceed, but the wireless terminal must switch to a frequency channel that is available at the handoff candidate and drop communications with the primary base station. In any event, FIG. 5b illustrates the operations performed by the primary controller after it receives acknowledgement that a semisoft handoff to the handoff candidate will occur.

Initially, in step 552, the primary controller transmits a semisoft handoff signal to the wireless terminal instructing it to begin transmitting to the handoff candidate on the new CDMA channel. The wireless terminal, after establishing communications with the handoff candidate, transmits a signal acknowledging that the handoff has occurred, which is received by the controller in step 554. The primary controller then, in step 556, releases control of or drops the call. The primary controller thereafter, in step 558, sends a message advising of the semisoft handoff to the switching center. At this point, the primary controller is finished processing with respect to the call transaction. The results achieved by the operations of steps 552, 554, 556 and 558 may alternatively be accomplished by any similar known semisoft handoff procedure.

Figure 6:
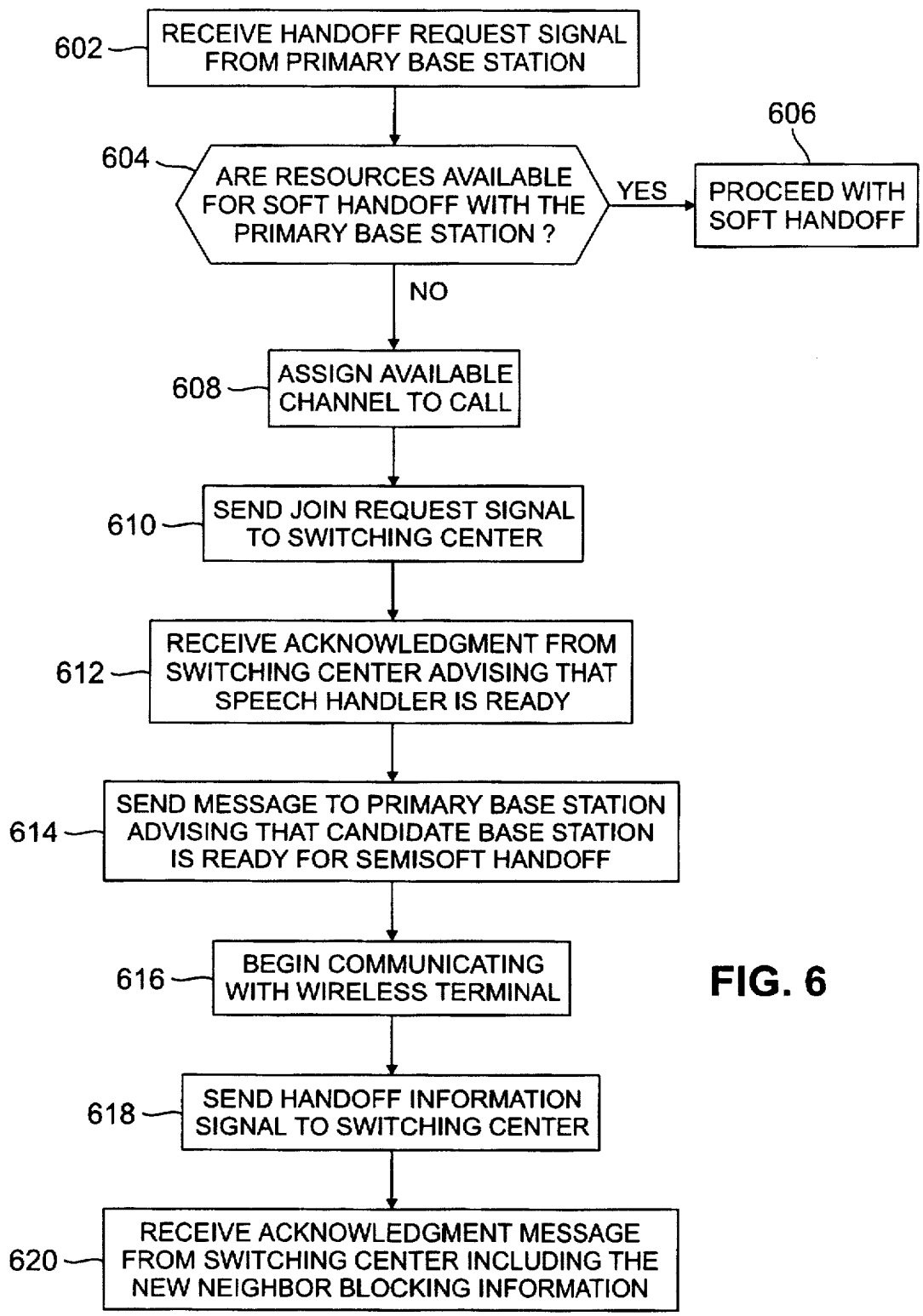
FIG. 6 illustrates an exemplary set of operations executed by a controller of a secondary base station during the course of a handoff procedure which correspond to the operations of the primary base station illustrated in FIGS. 5a and 5b.

FIG. 6 illustrates an exemplary set of operations executed by a controller of a handoff candidate during the course of a handoff procedure, which corresponds to the set of operations illustrated in FIGS. 5a and 5b, discussed above. The operations of the handoff candidate illustrated in FIG. 6 begin once a request message is transmitted by the controller of the primary base station in step 420. The operations described below are performed by a controller, such as the controller 241 of FIG. 2, of the handoff candidate. The handoff candidate controller will be referred to for the purposes of FIG. 6 as simply the candidate controller.

In step 602, the candidate controller receives a handoff request signal from the primary controller. The handoff request signal typically includes information identifying the CDMA channel used by the primary base station to communicate with the wireless terminal. In step 604, the candidate controller determines whether the candidate base station has the resources available to execute a soft handoff. To this end, a candidate controller determines, among other things, whether the candidate base station has an available CDMA channel that utilizes the same frequency band as that utilized by the CDMA channel on which the primary base station communicates with the wireless terminal. If sufficient resources are available, then the candidate controller proceeds to step 606 to execute the soft handoff. The operations associated with the candidate controller during a soft handoff are known to those of ordinary skill in the art.

If resources are not available, however, then a soft handoff is not possible, and the candidate controller proceeds to step 608 to begin the execution of a semisoft handoff. In step 608, the candidate controller assigns an available CDMA channel to the call. The candidate controller then, in step 610, transmits a join request signal to the switching center requesting access to the speech handler which is associated with the call. If access to the speech handler is provided, then the switching center transmits and the candidate controller receives, in step 612, a signal advising that the speech handler is ready. Then, in step 614, the candidate controller transmits a signal to the primary base station advising that the handoff candidate is ready for a semisoft handoff and further provides handoff implementation information including the CDMA channel which will be used by the handoff candidate.

The handoff candidate thereafter commences servicing the call in step 616. The handoff candidate typically begins servicing the call after the primary base station has directed the wireless terminal to switch channels to the new CDMA channel, such as is shown in step 552 of FIG. 5b. After communications with the wireless terminal are established, the semisoft handoff has been completed from the subscriber's perspective. Returning to FIG. 6, in step 618, the handoff candidate transmits an information signal to the switching center. The information signal contains information similar to that which is described above in connection with step 506 of FIG. 5a. The switching center thereafter considers the candidate base station to be the primary base station. The switching center then transmits, and the candidate controller receives in step 620, an update signal which includes the new neighbor blocking list.

One of the advantages of the present invention illustrated above is that the neighbor blocking list is updated after the execution of any handoff in which a new base station is added to service the call. After each handoff, whether soft or semisoft, the primary base station controller (as designated after the handoff) sends a handoff information signal which informs the switching center of all the base stations servicing the call, and the switching center sends a responding acknowledgement signal which includes the updated neighbor blocking information. Because such information is passed between the switching center and primary base station after the handoff has occurred, it does not add delay to the execution of the handoff from the subscriber's perspective.

Figure 7:
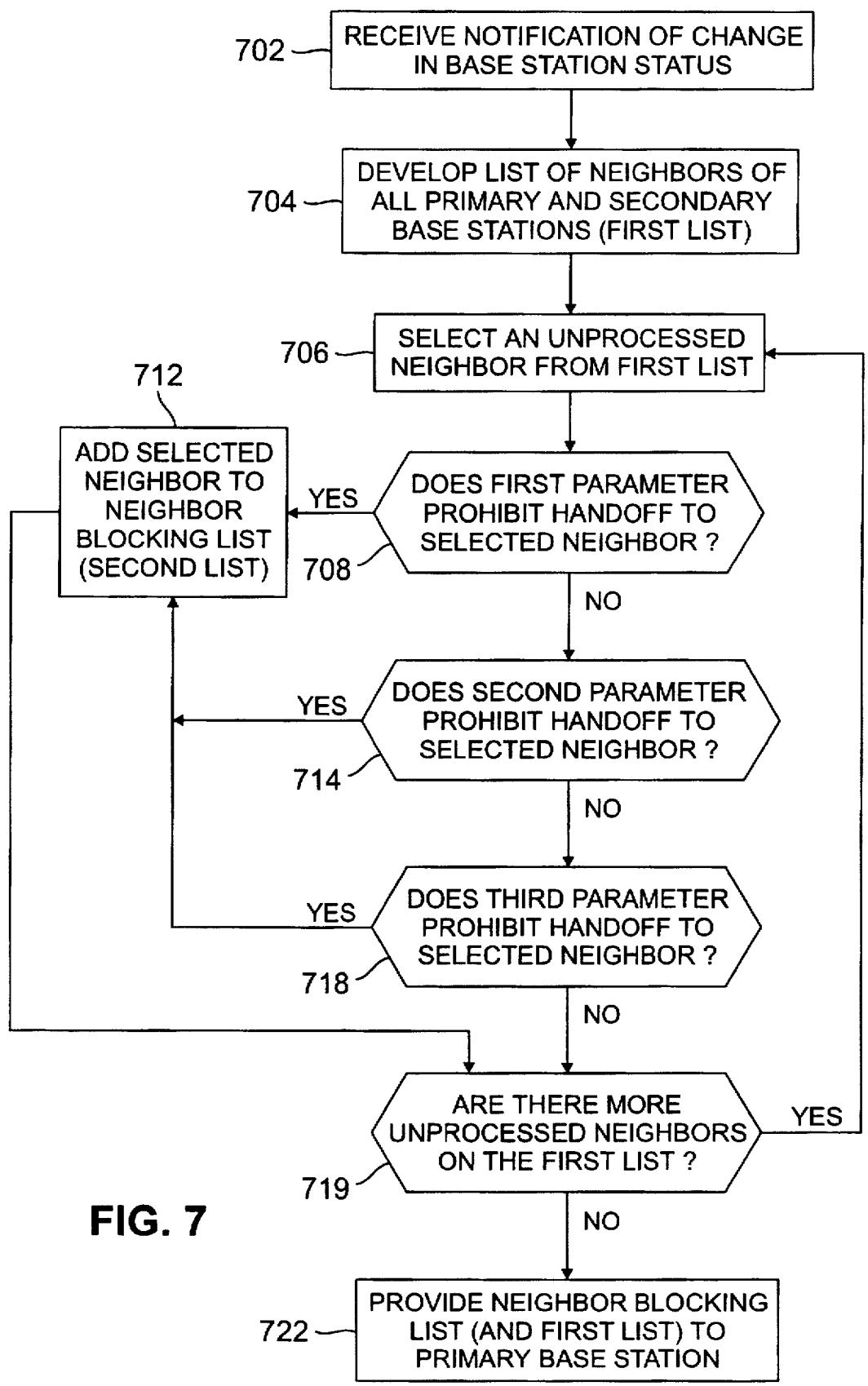
FIG. 7 illustrates an exemplary set of operations executed by a central control processor operating in accordance with the present invention.

An important feature of the present invention is the ability of the switching center, and in particular the CCP located therein, to generate a neighbor blocking list and provide it to the primary base station. FIG. 7 illustrates an exemplary set of operations executed by a CCP located within the switching center upon a change in base station status for a call. A change in base station status includes soft handoffs which are discussed above in connection with FIGS. 3 and 5a, semisoft handoffs which are discussed in connection with FIGS. 5b and 6, and call initialization procedures as discussed above in connection with FIG. 4a. Changes in base station status may further include so-called softer handoffs and hard handoffs which are discussed further below. There may of course be cases in which a change in base station status occurs but the CCP 120 does not generate a neighbor blocking list. For example, the mere removal of the base station from a call does not necessarily require the generation of a new neighbor blocking list, because such a removal would not result in the availability of additional neighbor base stations for subsequent handoffs. In such cases, the operations in FIG. 7 need not be performed.

In any event, in step 702, the CCP, which may suitably be the CCP 120 of FIG. 2, receives a signal advising that a change in base station status has occurred. For example, such a signal may be an information signal such as one of the information signals discussed in connection with steps 506 and 618 of FIGS. 5a and 6 respectively, or a call origination signal such as that discussed in connect with step 456 of FIG. 4b.

Upon receiving the notice of change in base station status, the CCP in step 704 uses the information to develop a first list of neighbor base stations. The first list includes all base stations that are considered a neighbor of the primary and any secondary base stations that are currently servicing the call transaction. The identification of the neighbors to each base station in the wireless network is stored in a data base that is accessible either directly or indirectly by the CCP. Typically, the neighbor base stations corresponding to a particular base stations are those base station in relatively close proximity to that particular base station.

Once the first list of neighbor base stations is developed in step 704, the CCP in steps 706 through 719 generates a second list comprising a list of subscriber ineligible neighbors, or neighbor blocking list, which will be forwarded to the primary base station.

The second list is developed by processing all of the neighbors identified on the first list in the following manner. In step 706, the CCP selects an unprocessed neighbor from the first list. Then, in step 708, the CCP determines whether a first subscriber-specific parameter prohibits the subscriber from using the selected neighbor. For example, the first parameter may pertain to a cellular telephone roaming feature, which allows subscribers to be serviced by base stations outside their local service area. If the subscriber has not elected the roaming feature, and the selected neighbor is outside the subscriber's local service area, then the use of the selected neighbor by the subscriber would be prohibited.

If, in step 708, it is determined that the first parameter prohibits use of the selected neighbor, then, in step 712, the CCP adds the selected neighbor to the second list of subscriber ineligible neighbors. The select ed neighbor is thereafter considered to be processed. Thereafter, in step 719, the CCP determines whether there are any more unprocessed neighbors on the first list. If so, the CCP returns to step 706 to select a new unprocessed neighbor. If not, however, the generation of the second list or neighbor blocking list has been completed and the CCP proceeds to step 722, discussed further below.

If, however, in step 708, the answer is no, then the CCP proceeds to step 714. In step 714, the CCP determines whether a second subscriber-specific parameter prohibits the use of that neighbor by the subscriber. The second parameter may suitably pertain to another service that independently causes one or more base stations to be blocked from use by a particular subscriber. If it is determined that the second parameter prohibits the use of the neighbor, then the CCP proceeds to step 712 to add the selected neighbor to the second list and thereafter proceeds as described above with respect to step 712. If, however, in step 714 it is determined that the neighbor is not prohibited by the second parameter, then the CCP proceeds to step 718. In step 718, the CCP determines whether a third parameter prohibits the use of that neighbor by the subscriber. If so, then the CCP proceeds to step 712. If not, however, then the neighbor is not blocked by any of the three subscriber-specific parameters, and the CCP considers the neighbor processed and returns to step 719 to determine if there are more unprocessed neighbors.

The above procedure for determining the second list, or neighbor blocking list is given by way of example only.

Other methods of determining a suitable neighbor blocking list may readily be implemented by those of ordinary skill in the art. Similarly, the use of three parameters that may potentially block the use of a neighbor is, of course, given by way of example only. The method described above may readily be altered to accommodate any number of services, features or parameters by adding or subtracting steps similar to steps 708, 714, or 718.

In any event, in step 722, the CCP provides subscriber-specific information in the form of the neighbor blocking list to the primary base station. Step 722 may be carried out in a handoff information acknowledgment message in the case of a handoff, such as that described in connection with steps 508 and 620 of FIGS. 5a and 6 respectively, or in call attribute message such as that described in connection with step 458 of FIG. 4b.

It is to be noted that the advantages of the present invention may also be realized in handoff types commonly known hard handoffs and softer handoffs. Hard handoffs are similar to semisoft handoffs in that they ordinarily involve dropping the servicing base station and adding a new base station that will become the new primary base station. Hard handoffs differ from semisoft handoffs in the fact that they involve a change in the speech handler within the switching center 120 that is associated with the call. In any event, for the purposes of the generation, transmission and use of the neighbor blocking list according to the present invention, the hard handoff may be executed in the same manner as described above with respect to a semisoft handoff.

A softer handoff involves a handoff within a base station. At present, some base stations have the functionality of a plurality of base stations, and, accordingly, are divided up into a plurality cell faces, typically three. Each cell face is operable to service call transactions in the same manner as a base station would. In fact, a multiple face base station may be thought of as a group of base stations that share some hardware functionality and are located in close proximity.

A softer handoff is a type of handoff that occurs between cell faces of the same base station. A softer handoff is similar in execution to a soft handoff except that due to the shared hardware functionality, less hardware operations are necessary to complete the handoff. In any event, for the purposes of the generation, transmission, and use of the neighbor blocking list according to the present invention, the softer handoff may be executed in a similar manner as a soft handoff, discussed above, except that the phrase "base station" as used in FIGS. 5a, 6 and 7 should be associated with a cell face of a multiple face base station. For example, the phrase "primary base station" as used in FIGS. 5a, 6 and 7 would actually describe a primary base station face, and the phrases "candidate base station" or "secondary base station" would describe another face on the same base station. Any other modifications required to adapt the soft handoff method of the present invention for use in a softer handoff method would be apparent to those of ordinary skill in the art.

It is to be understood that the above-described embodiments of the invention are merely illustrative. Other implementations may readily be devised by those of ordinary skill in the art which will embody the principles of the invention and fall within the spirit and scope thereof. For example, the operations described in FIGS. 4a, 4b, 5a, 5b, 6 and 7 may readily be adapted to systems using multiple-face base stations by those of ordinary skill in the art. In such systems, for example, a handoff candidate would be a neighbor base station cell face.

I claim:

1. A base station for use in a wireless communication network including a switching center and one or more neighbor base stations, said switching center having access to subscriber-specific parameters and operable to generate subscriber-specific information therefrom, said base station comprising:

a) a radio for communicating with a wireless terminal using radio signals;

b) a circuit connected to the radio for converting radio signals to digital signals, said circuit operable to provide the digital signals to the switching center;

c) a base station controller operable to select a handoff candidate from the one or more neighbor base stations based on one or more neighbor base station signal quality measurements and subscriber-specific information received from the switching center; and transmit a request signal to the handoff candidate requesting a handoff.

2. The base station of claim 1 wherein the base station controller is further operable to:

transmit an information signal to the switching center after the handoff has occurred, the information signal containing information identifying the handoff candidate; and receive an update signal from the switching center containing updated subscriber-specific information.

3. The base station of claim 1 wherein the base station controller is further operable to select the handoff candidate based on subscriber-specific information, wherein the subscriber-specific information comprises a neighbor blocking list, said neighbor blocking list identifying those of the one or more neighbor base stations for which handoff is prohibited.

4. Base station of claim 3 wherein the base station controller is further operable to select from neighbor base stations the candidate handoff base station by:

receiving from the wireless terminal a signal containing information representative of one or more signal quality measurements, the signal quality measurements corresponding to each of one or more neighbor base stations;

determining whether there is an eligible handoff candidate, the eligible handoff candidate comprising one of the one or more neighbor base stations, said determination based in part on the signal quality measurements; and determining whether handoff is permitted to the eligible handoff candidate based on the neighbor blocking list.

5. The base station of claim 1 wherein the base station comprises a first face of a multiple-face base station and the handoff candidate comprises a second face of the multiple-face base station.

6. The base station of claim 3 wherein the radio is operable to communicate with the wireless terminal over a first radio channel, said first radio channel defined in part by a frequency band, and wherein the base station controller is operable to:

receive a handoff acknowledgement signal from the handoff candidate indicating that the handoff candidate can communicate on a second radio channel, said second radio channel defined in part by the frequency band; and transmit a handoff signal to the wireless terminal causing the wireless terminal to begin radio communications with the handoff candidate.

7. The base station of claim 1 wherein the radio is operable to communicate with the wireless terminal over a first radio channel, said first radio channel defined in part by a frequency band, and wherein the base station controller is operable to:
- receive a handoff acknowledgement signal from the handoff candidate indicating that the handoff candidate has resources available to communicate on a second radio channel, said second radio channel defined in part by the frequency band; and
- transmit a handoff signal to the wireless terminal causing the wireless terminal to begin radio communications with the handoff candidate.

8. The base station of claim 1 wherein the base station controller is further operable to release control of the call after the handoff candidate begins communicating with the wireless terminal.

9. The base station of claim 1 wherein said radio communicates with the wireless terminal using code division multiple access ("CDMA") signals.

10. A switching center coupled to a plurality of base stations, each base station associated with one or more neighbor base stations, said switching center comprising:
a) a digital control switch for receiving call signals from one or more base stations, the digital control switch operable to provide the call signals to a communications network;
b) a central control processor that is operable to, upon notification of a base station status change for a call,
generate a first list comprising neighbor base stations associated with one or more base stations servicing the call,
generate from the first list a second list of subscriber ineligible neighbors based on subscriber-specific parameters, and
provide an update signal containing data representative of the second list to a primary base station.

11. The switching center of claim 10 wherein the central control processor is further operable to provide said update signal to the primary base station within a handoff acknowledgement signal.

12. The switching center of claim 10 wherein the central control processor is operable to generate said first list and second list upon notification of a base station status change comprising an origination of the call.

13. The switching center of claim 12 wherein the central control processor is further operable to provide the update signal to the primary base station within a call attribute signal.

14. The switching center of claim 10 wherein the central control processor is operable to generate said first list and second list upon notification of a base station status change comprising a soft handoff, wherein said soft handoff includes an addition of a secondary base station to service the call.

15. The switching center of claim 14 the central control processor is further operable to provide the update signal to the primary base station within a handoff acknowledgement signal.

16. The switching center of claim 10 wherein said primary base station comprises a first face of a multi-face base station, and the central control processor is operable to generate said first list and second list upon notification of a base station status change comprising a softer handoff, wherein said softer handoff includes an addition of a second face of the multi-face base station to service the call.

17. The switching center of claim 16 the central control processor is further operable to provide the update signal to the first face of the multi-face base station within a handoff acknowledgement signal.

18. The switching center of claim 10 wherein the central control processor is operable to generate said first list and second list upon notification of a base station status change comprising a handoff wherein at least one base station is added to service the call and at least one base station is dropped from servicing the call.

19. The switching center of claim 10 wherein the central control processor is further operable to provide an update signal containing data representative of the first list to the primary base station.

20. The switching center of claim 10 wherein the central control processor is further operable to generate the second list of subscriber-ineligible neighbors from the first list of neighbor base stations by
i) obtaining subscriber-specific parameters representative of one or more subscriber-specific features;
ii) determining whether a first parameter of the one or more subscriber-specific parameters render a selected base station from the first list ineligible as a handoff candidate; and
iii) repeating step ii) for a plurality of the base stations identified on the first list of neighbor base stations.

21. The switching center of claim 10 wherein said digital control switch is operable to receive call signals in the form of digital data packets.

22. The switching center of claim 10 wherein the digital control switch further comprises a speech handler, said speech handler operable to receive call signals associated with the call and convert the call signals into a format convertible with an external network.

23. A method of performing a handoff during a call in a wireless communication system, the wireless communication system comprising a switching center, a first base station servicing the call prior to handoff, and a second base station, said method comprising:
a) executing the handoff between the first base station and the second base station, wherein the second base station is added to service the call;
b) notifying the switching center that the handoff has occurred;
c) employing the central control processor to determine a list of neighbor base stations which are ineligible for a subsequent handoff; and
d) forwarding the list to at least one base station servicing the call after execution of the handoff.

24. The method of claim 23 wherein step c) further includes employing the central control processor to determine the list of neighbor base stations which are ineligible for a subsequent handoff using subscriber-specific parameters.

25. The method of claim 23 wherein step a) further includes executing a soft handoff between the first base station and the second base station and step d) further includes forwarding the list to first base station.

26. The method of claim 23 further including a step e) selecting a handoff candidate for a subsequent handoff based on the list.

27. The method of claim 23 wherein step c) further comprises first employing the central control processor to determine a first list of neighbor base stations associated with the call and then determining the list of neighbor base stations which are ineligible for a subsequent handoff based on the first list.

28. The method of claim 23 wherein step a) further includes executing a semisoft handoff between the first base station and second base station and step d) further includes forwarding the list to the second base station.

29. The method of claim 27 wherein step b) further comprises providing an information signal to the switching center after the handoff has occurred, the information signal containing information identifying the second base station; and wherein step c) further comprises determining the first list of neighbor base stations based in part on the information signal.

30. The method of claim 26 wherein step e) further comprises receiving from a wireless terminal associated with the call a signal containing information representative of one or more signal quality measurements, the signal quality measurements corresponding to each of one or more neighbor base stations;

determining whether there is an eligible handoff candidate, the eligible handoff candidate comprising one of the one or more neighbor base stations, said determination based in part on the signal quality measurements; and determining whether handoff is permitted to the eligible handoff candidate based on the list.

* * * * *